(12) United States Patent
Mendelson et al.

(10) Patent No.: US 12,004,641 B2
(45) Date of Patent: Jun. 11, 2024

(54) RACK MOUNT FOR LOAD

(71) Applicant: PEGASUS MEDICAL LTD., Ramat Gan (IL)

(72) Inventors: Oren Mendelson, Hod Hasharon (IL); Idan Aviad, Givataim (IL)

(73) Assignee: PEGASUS MEDICAL LTD., Ramat Gan (IL)

( * ) Notice: Subject to any disclaimer, the term of this patent is extended or adjusted under 35 U.S.C. 154(b) by 128 days.

(21) Appl. No.: 17/616,669

(22) PCT Filed: Jun. 4, 2020

(86) PCT No.: PCT/IL2020/050622
§ 371 (c)(1),
(2) Date: Dec. 5, 2021

(87) PCT Pub. No.: WO2020/245825
PCT Pub. Date: Dec. 10, 2020

(65) Prior Publication Data
US 2022/0295985 A1  Sep. 22, 2022

Related U.S. Application Data

(60) Provisional application No. 62/857,839, filed on Jun. 6, 2019.

(51) Int. Cl.
*A47B 47/00* (2006.01)
*A47B 96/14* (2006.01)
(Continued)

(52) U.S. Cl.
CPC .......... *A47B 47/00* (2013.01); *A47B 96/1408* (2013.01); *A47B 96/1433* (2013.01);
(Continued)

(58) Field of Classification Search
CPC . A47B 96/14; A47B 96/1408; A47B 96/1433; A47B 47/00; A47B 47/0041;
(Continued)

(56) References Cited

U.S. PATENT DOCUMENTS 3,199,683 A * 8/1965 Graswich ............. A47B 57/425
 211/208
3,420,557 A * 1/1969 Walter ...................... E04G 7/32
 403/256

(Continued)

FOREIGN PATENT DOCUMENTS

CN 1255589 A 6/2000
CN 203709576 U 7/2014
(Continued)

OTHER PUBLICATIONS

PCT International Search Report for International Application PCT/IL2020/050622, mailed Jul. 23, 2020, 7pp.
(Continued)

*Primary Examiner* — Devin K Barnett
(74) *Attorney, Agent, or Firm* — The Roy Gross Law Firm, LLC; Roy Gross

(57) ABSTRACT

A manually assemblable/disassemblable rack mount for a load comprising: (a) a frame having first and second parallel spaced uprights arranged in a pair; each upright comprising a side projection having notches distributed along said side projection; (b) at least one crossbar member having first and second terminals; said at least one crossbar member releasably securable between said first and second parallel spaced uprights. The rack mount comprises terminal adapters connectable to said first and second terminals. The rack mount comprises anchoring plug members insertable into said notches. Each terminal adapter has a claw insertable into a bore within said anchoring plug members. At least one crossbar with said terminal adapters connected to said first (Continued)

and second terminals of said at least one crossbar is releasably mountable in a bridge position between said first and second parallel spaced uprights.

14 Claims, 22 Drawing Sheets

(51) Int. Cl.
*A47B 47/02* (2006.01)
*A47B 57/06* (2006.01)
*A47B 57/20* (2006.01)
*A47B 57/48* (2006.01)

(52) U.S. Cl.
CPC ............. *A47B 47/028* (2013.01); *A47B 57/06* (2013.01); *A47B 57/20* (2013.01); *A47B 57/48* (2013.01); *A47B 96/14* (2013.01)

(58) Field of Classification Search
CPC . A47B 47/0016; A47B 47/027; A47B 47/028; A47B 57/06; A47B 57/485; A47B 57/482; A47B 57/48; A47B 57/20
See application file for complete search history.

(56) References Cited

U.S. PATENT DOCUMENTS

| | | | | | |
|---|---|---|---|---|---|
| 3,696,763 | A | * | 10/1972 | Evans | A47B 47/03 108/157.13 |
| 3,817,641 | A | * | 6/1974 | Steele | E04G 7/307 403/256 |
| 4,039,264 | A | * | 8/1977 | Sharp | F16B 7/0486 403/49 |
| 4,996,929 | A | * | 3/1991 | Saal | A47B 47/021 211/187 |
| 5,190,171 | A | * | 3/1993 | Christman, Jr. | A47B 87/0246 211/186 |
| 5,579,703 | A | * | 12/1996 | King | F16B 12/40 108/186 |
| 5,601,016 | A | * | 2/1997 | Witte | A47B 43/003 108/106 |
| 6,123,209 | A | * | 9/2000 | Tseng | A47B 47/021 211/186 |
| 6,290,073 | B1 | * | 9/2001 | Barnes, Sr. | F24B 15/00 211/175 |
| 6,431,090 | B1 | * | 8/2002 | Davis | A47B 57/04 108/107 |
| 8,616,138 | B1 | * | 12/2013 | Fu | A47B 57/545 211/187 |
| 8,739,986 | B2 | * | 6/2014 | Preidt | A47F 5/00 211/188 |
| 9,282,820 | B2 | * | 3/2016 | Lo | A47B 87/0207 |
| 9,538,841 | B2 | * | 1/2017 | Franck | A47B 46/00 |
| 2002/0153341 | A1 | * | 10/2002 | May | A47B 57/402 211/208 |
| 2005/0196230 | A1 | | 9/2005 | Dubon et al. | |
| 2006/0152115 | A1 | * | 7/2006 | Dubon | A47B 88/43 312/334.8 |
| 2007/0053170 | A1 | | 3/2007 | Yu | |
| 2009/0184076 | A1 | * | 7/2009 | Lee | A47B 57/54 211/189 |
| 2012/0234786 | A1 | * | 9/2012 | Shinozaki | A47B 57/34 211/153 |
| 2015/0027968 | A1 | * | 1/2015 | Murakami | H05K 7/1489 211/26 |
| 2016/0037913 | A1 | * | 2/2016 | Franck | A47B 57/10 211/208 |
| 2016/0157610 | A1 | * | 6/2016 | Chen | A47B 88/43 248/219.3 |
| 2017/0223863 | A1 | * | 8/2017 | Jost | H05K 7/1401 |
| 2018/0289151 | A1 | | 10/2018 | Dahatonde et al. | |
| 2019/0059585 | A1 | | 2/2019 | Chen et al. | |

FOREIGN PATENT DOCUMENTS

| | | |
|---|---|---|
| CN | 203727583 U | 7/2014 |
| CN | 104832510 A | 8/2015 |
| CN | 105025753 A | 11/2015 |
| CN | 205370102 U | 7/2016 |
| CN | 107504346 A | 12/2017 |
| CN | 108316638 A | 7/2018 |
| CN | 108419405 A | 8/2018 |
| CN | 207848127 U | 9/2018 |
| JP | 2006130179 A | 5/2006 |
| JP | 2014097228 A | 5/2014 |

OTHER PUBLICATIONS

PCT Written Opinion for International Application PCT/IL2020/050622, mailed Jul. 23, 2020, 4pp.
Office Action for Chinese Patent Application No. 202080041814.3, dated Nov. 8, 2023, 11pp.

* cited by examiner

RACK MOUNT FOR LOAD

CROSS-REFERENCE TO RELATED APPLICATIONS

This application is a U.S. National Phase filing under 35 U.S.C. 371 of International (PCT) Patent Application No. PCT/IL2020/050622, filed Jun. 4, 2020, which claims benefit to U.S. Provisional Patent Application No. 62/857,839 filed Jun. 6, 2019, both of which are incorporated by reference in their entirety.

FIELD OF THE INVENTION

The present invention relates to racks for supporting a load and, more specifically, to portable and adjustable rack.

BACKGROUND OF THE INVENTION

A large number of different connecting devices have been developed for joining a crossbar member to an upright, and these connectors have found use in adjustable storage racks of various types, particularly those sometimes referred to as pallet racks. Nearly all of these different types of connectors utilize apertures at spaced vertical locations which are formed, usually by punching, in one or more of the walls of the column. These spaced apertures provide adjustability and allow beams to be located at different vertical heights, or subsequently repositioned, depending upon the particular product being stored. A shaped connector element welded to the end of the beam may directly engage the apertures in the column, or a separate pin device may first be inserted at the desired vertical location which is in turn engaged by a connector element at the end of the beam.

U.S. Pat. No. 3,199,683 discloses a combination of a portable frame having a plurality of upright members forming corner members of said frame. Each of the upright members has a plurality of substantially equally spaced notches such that corresponding notches in said upright members are all positioned at the same elevation in the frame. A plurality of elongated angle-shaped slide members each has a vertical portion and a horizontal pan supporting portion, said slide members having inwardly tilted channel portions attached thereto, the end parts of said channel portions being loosely positioned in corresponding opposed notches of said upright members so that the upper end parts of said tilted channel portions are positioned adjacent to said upright members above these notches and the slide can be disengaged therefrom only by lifting the slide.

At the moment, assembling and customizing known storage racks according to customer needs is quite laborious and time consuming Thus, there is a long-felt and unmet need for providing an easy-to-handle rack mount for a universal load characterized by high portability and adjustability.

SUMMARY OF THE INVENTION

It is hence one object of the invention to disclose a manually assemblable/disassemblable rack mount for a load comprising: (a) a frame having first and second parallel spaced uprights arranged in a pair; each upright comprising a side projection having notches distributed along said side projection; (b) at least one crossbar member having first and second terminals; said at least one crossbar member releasably securable between said first and second parallel spaced uprights.

It is a core purpose of the invention to provide the rack mount comprising terminal adapters connectable to said first and second terminals; said rack mount comprises anchoring plug members insertable into said notches; each terminal adapter has a claw insertable into a bore within said anchoring plug members. At least one crossbar with said terminal adapters connected to said first and second terminals of said at least one crossbar is releasably mountable in a bridge position between said first and second parallel spaced uprights by inserting said claws of said first and second terminal adapters into said bores within said anchoring plug members being mounted in said notches.

A further object of the invention is to disclose the frame made of a hollow beam of a close profile.

A further object of the invention is to disclose any one of said first; and second terminals of said at least one crossbar member and the corresponding terminal adapter having cooperatively configured male and female members releasably connectable to each other.

A further object of the invention is to disclose the male and female members which are slidably connected to each other.

A further object of the invention is to disclose the male and female members which are threadly connected to each other.

A further object of the invention is to disclose at least one of said uprights, at least one crossbar member, terminal adapters, anchoring plug members and plates which is made of a material selected from the group consisting of a metal alloy, a composite material, a plastic material, wood and any combination thereof.

A further object of the invention is to disclose at least one pair of said terminal adapters configured for securing said crossbar to said uprights at an arbitrary angle thereto.

A further object of the invention is to disclose each of said at least one pair of said terminal adapters comprising a housing having internal surfaces forming a female slot for securing said terminals of said crossbar therewithin and a rotatable locking member configured for locking said terminals within said female slot; said locking member comprises a shaft portion having a latching cam on a terminal thereof which is insertable into a bore within said housing and a handle portion orthogonal to said shaft portion; each said handle portion has a claw on a terminal thereof into said bores within said anchoring plug members being mounted in said notches.

A further object of the invention is to disclose the rack mount comprising at least one pair of plates for mounting telescopic slides; each of said at least one pair of said plates is mechanically connectable to said anchoring plug members being mounted in said notches.

A further object of the invention is to disclose the telescopic slides provided with clamping members thereon; each of said at least one pair of said plates has at least one aperture configured for receiving said clamping members thereinto and securing said clamping members therewithin.

A further object of the invention is to disclose a method of manually assembling a rack mount comprising steps of: (a) providing a rack mount for a load comprising: (i) a frame having first and second parallel spaced uprights arranged in a pair; each upright comprising a side projection having notches distributed along said side projection; (ii) at least one crossbar member having first and second terminals; said at least one crossbar member releasably securable between said first and second parallel spaced uprights; (iii) said rack mount comprises terminal adapters connectable to said first and second terminals; said rack mount comprises anchoring plug members insertable into said notches; each terminal adapter has a claw insertable into a bore within said anchoring plug members; said at least one crossbar with said terminal adapters connected to said first and second terminals of said at least one crossbar is releasably mountable in a bridge position between said first and second parallel spaced uprights by inserting said claws of said first and second terminals into said bores within said anchoring plug members being in said notches; (b) positioning said uprights in a vertical position; (c) connecting said terminal adapters to said first and second terminals of said at least one crossbar member; (d) inserting said anchoring plug members into said notches; (e) mounting said at least one crossbar member by inserting said claws of said first and second terminals into said bores within said anchoring plug members.

A further object of the invention is to disclose the step of connecting said terminal adapters to said first and second terminals of said at least one crossbar member comprising releasably connecting male and female members to each other.

A further object of the invention is to disclose the step of connecting said terminal adapters to said first and second terminals of said at least one crossbar member comprising inserting said terminals into a female slot formed by internal surfaces of said terminal adapters and locking said terminal by a rotatable locking member having a latching cam.

A further object of the invention is to disclose the method comprising a step of mounting telescopic slides on plates further comprising mounting anchoring plug members on said plates, inserting said anchoring plug members into said notches and clamping said telescopic slides within apertures of said plates.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide rack mount for a load and a method of assembling the same.

Figure 1:
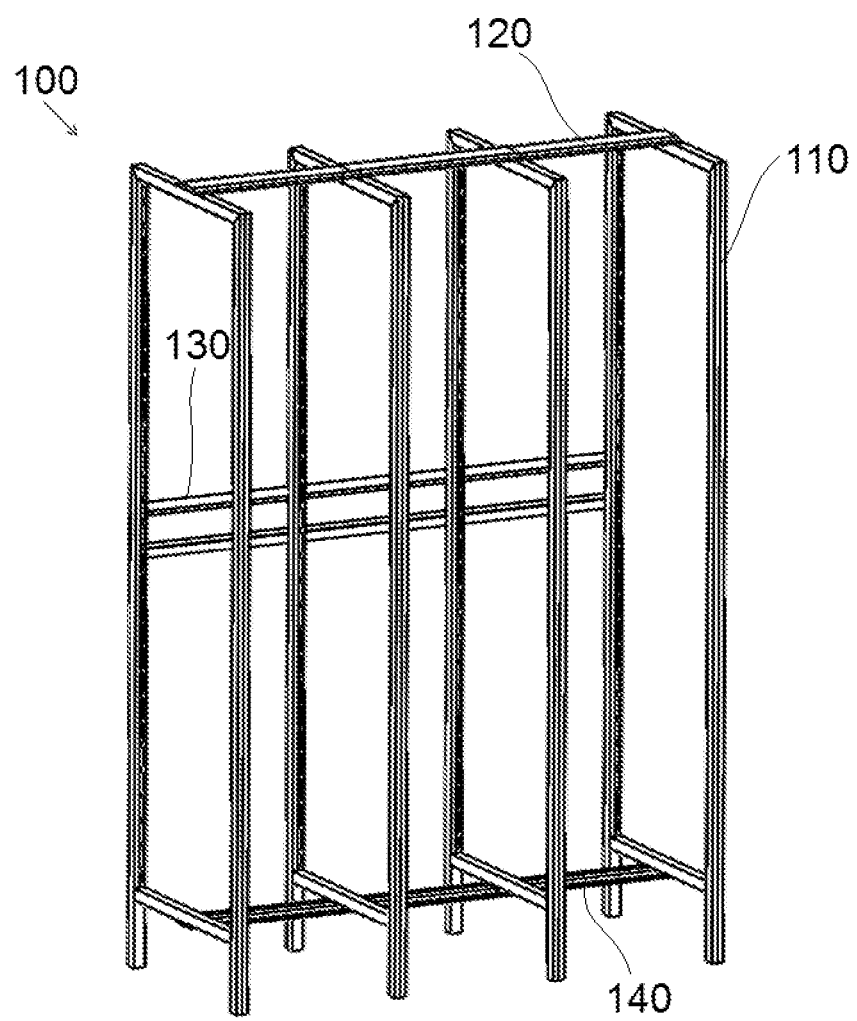
FIG. 1 is a schematic general view of a rack.

Reference is now made to FIG. 1, presenting a general view of rack 100. The aforesaid rack comprises frames 110 interconnected by linking members 120 and 130.

Figure 2:
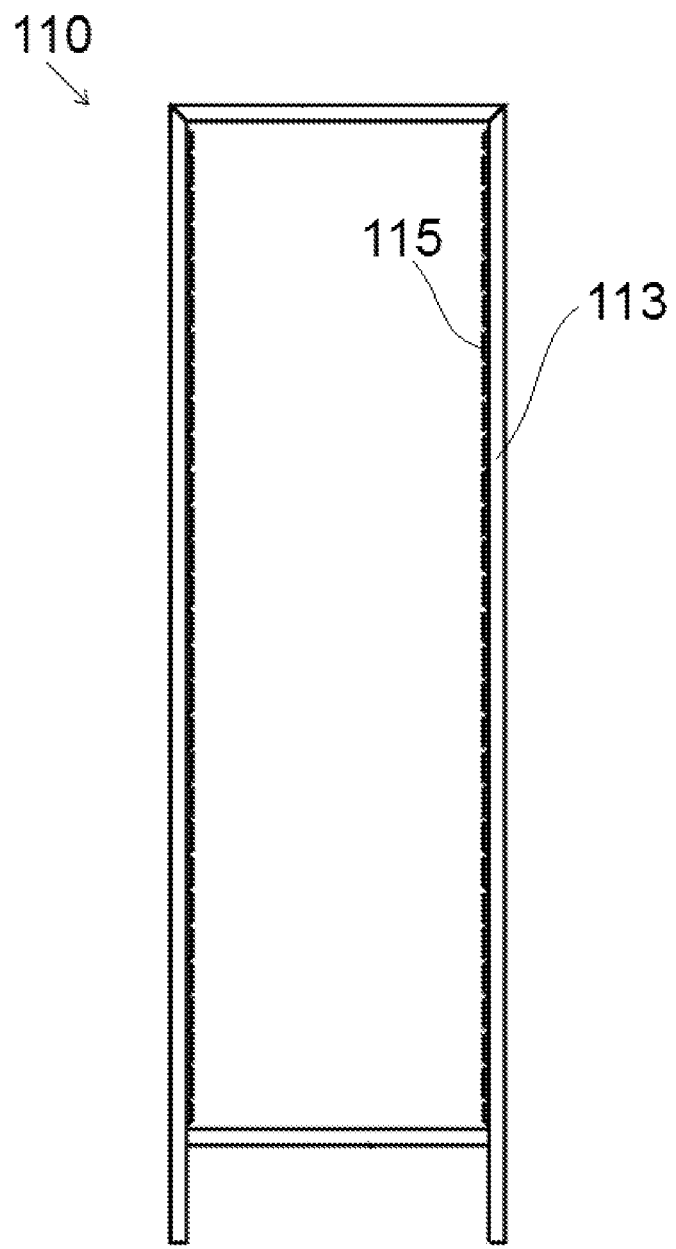
FIG. 2 is a side view of a frame.

Reference is now made to FIG. 2 presenting a side view of frame 110 comprising upright 113. The aforesaid uprights are provided with side projections 115.

Figure 3:
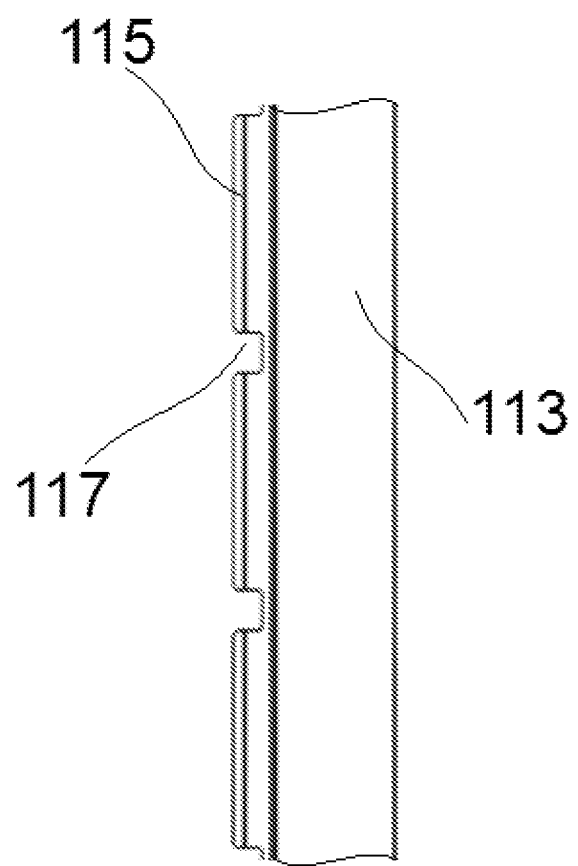
FIG. 3 is an enlarged view of an uptight.

Reference is now made to FIG. 3 presenting an enlarged view of upright 113. Side projection 115 has notches 117 distributed along the aforesaid side projection.

Figure 4A:
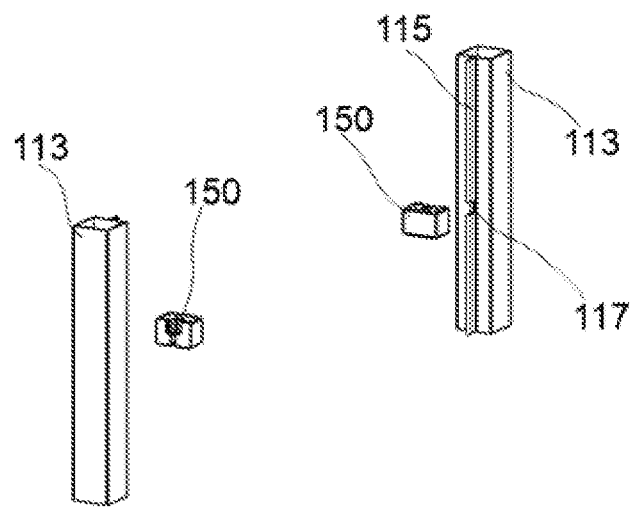
FIGS. 4a and 4b illustrate anchoring plug members securable within notches of uprights.
Figure 4B:
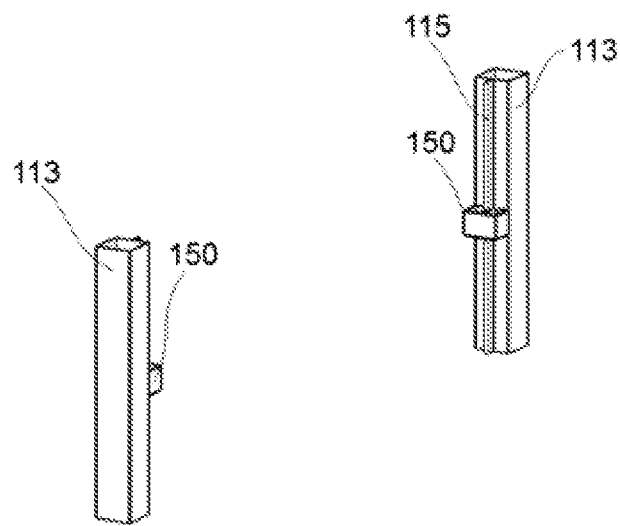

Reference is now made to FIGS. 4a and 4b illustrating anchoring plug members 150 securable within notches 117 of uprights 113. FIG. 4a shows anchoring plug members 150 unmounted on uprights 113. In FIG. 4b, anchoring plug members 150 is inserted into notches 117 of uprights 113.

Figure 5:
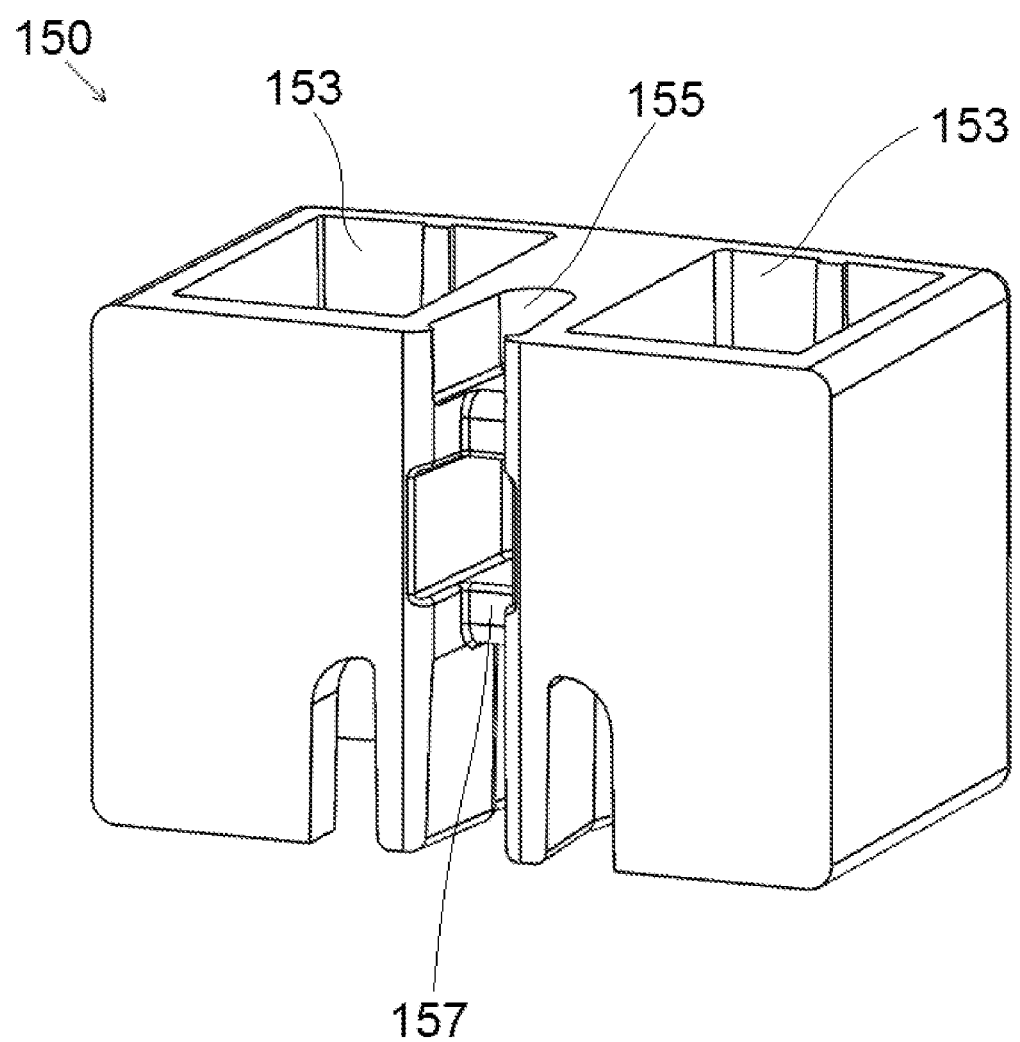
FIG. 5 is an enlarged view of an anchoring plug member.

FIG. 5 is now made to FIG. 5 presenting anchoring plug members 150. Each anchoring plug members comprises slit 155 with cog 157. Slit 155 is configured for receiving side projection 115 therewithin while cog 157 secures anchoring plug member 150 on side projection 115 when inserted into notch 117 (FIG. 3).

Figure 6A:
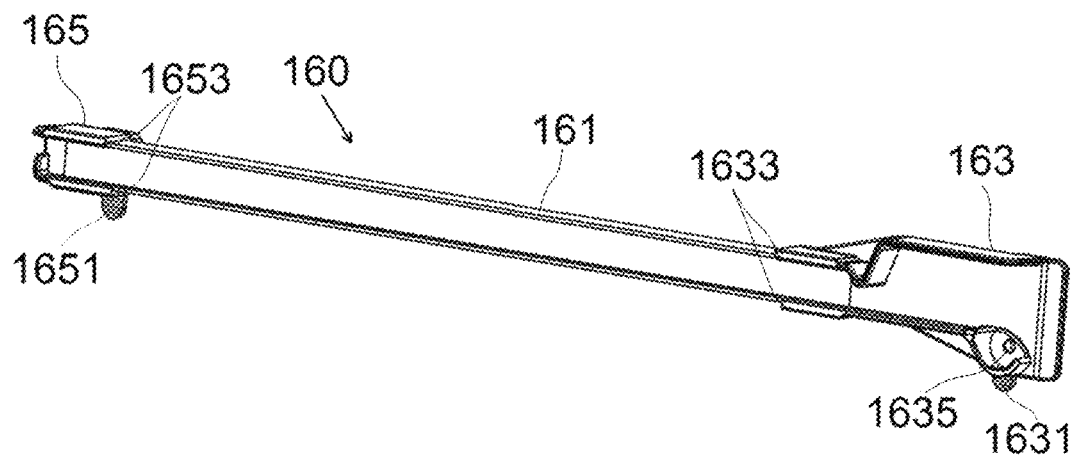
FIGS. 6a and 6b are front and back views of a crossbar member with terminal adapters connected to terminals thereof.
Figure 6B:
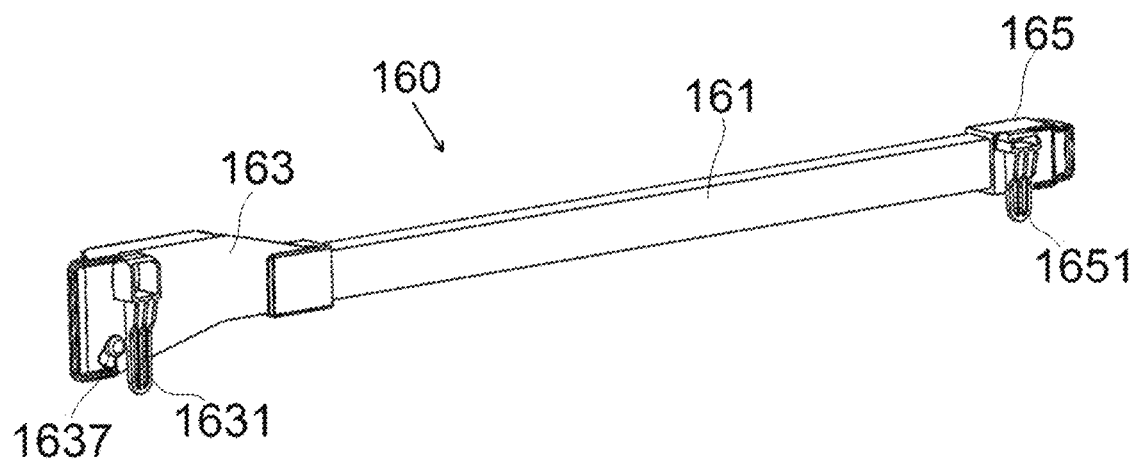

Reference is now made to FIGS. 6a and 6b presenting front and back views of crossbar member 161 with terminal adapters 163 and 165 connected to terminals of crossbar member 161. According to one embodiment of the present invention, the terminals of crossbar member 161 are slidably inserted into socket 1633 and 1653. Terminal adapters 163 and 165 are provided with claws 1631 and 1651, respectively. Numerals 1635 and 1637 refer to an opening for a reduced friction wheel and a corresponding mechanism.

Figure 7:
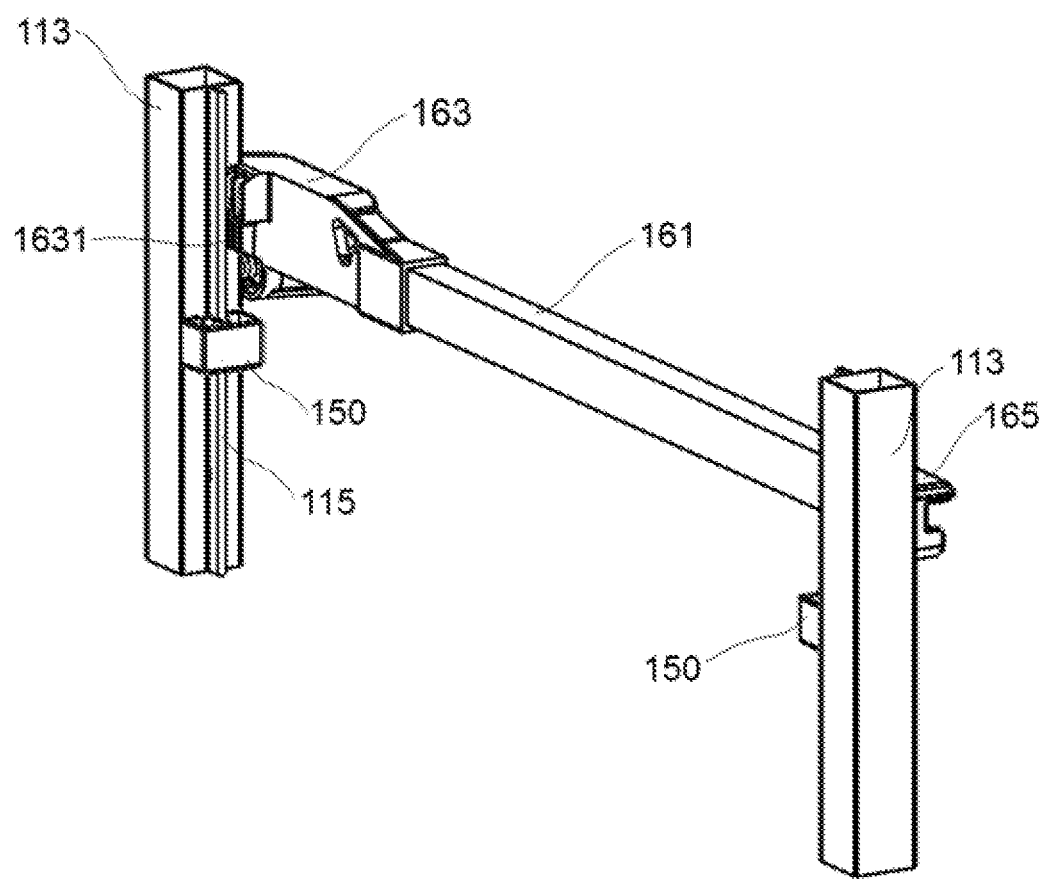
FIG. 7 illustrates securing a crossbar member to uprights.

Reference is now made to FIG. 7 presenting crossbar member 161 with terminal adapters 163 and 165 connected thereto before mounting onto uprights 113. Specifically, claws 1631 and 1635 (not shown) are to be inserted into anchoring plug members 150 secured on side projection 115.

Figure 8A:
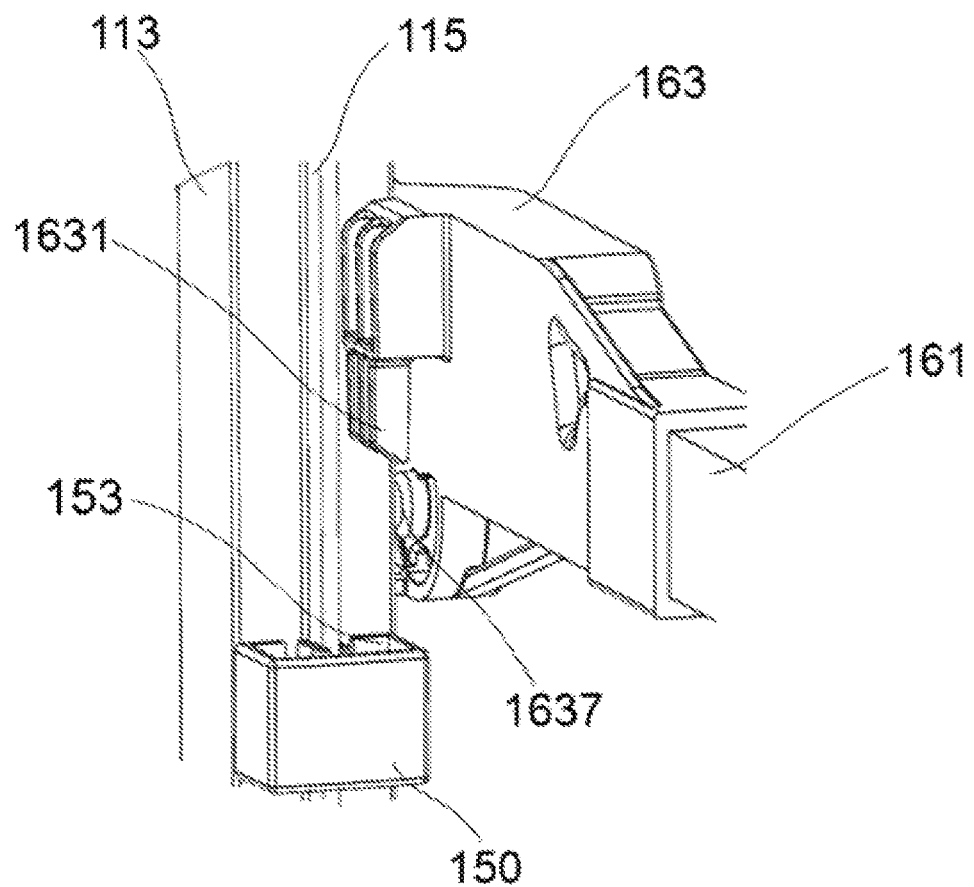
FIGS. 8a and 8b are enlarged views of terminal adapters connected to first and second terminals of a crossbar member.
Figure 8B:
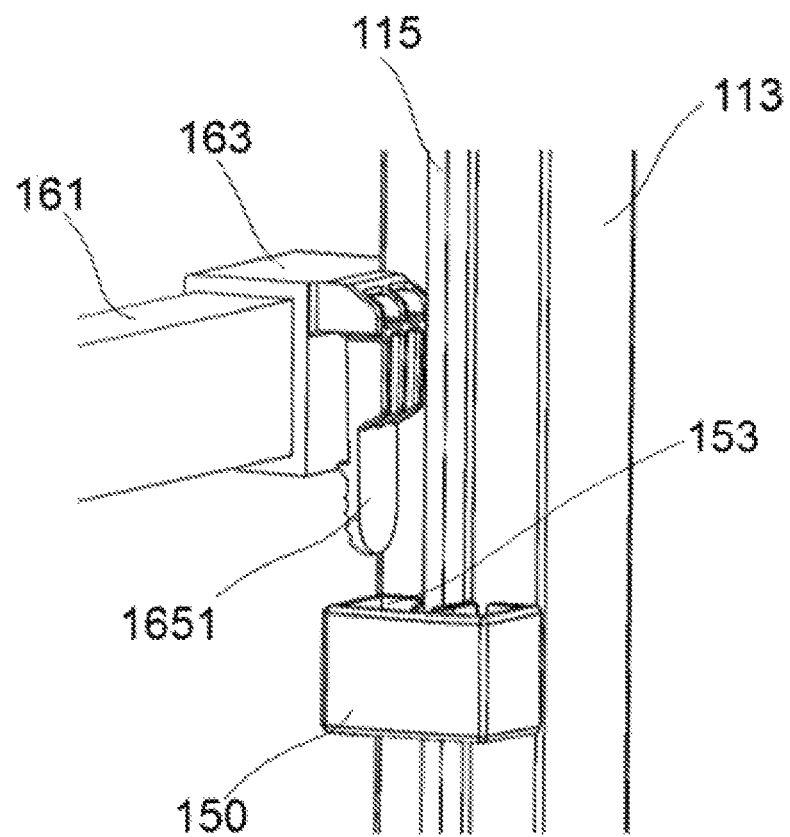

Reference is now made to FIGS. 8a and 8b presenting enlarged views of terminal adapters 163 and 165 connected to crossbar member 161. In FIG. 8a, claw 1631 of terminal adapters 163 is insertable into bore 153. FIG. 8b shows the same position concerning claw 1651 of terminal adapters 165. It should be mentioned that rack 100 of the present invention is quick assemblable and disassemblable in a manual manner without any mechanical or other tools. In assembled position, rack 100 is free of open holes being conducive for fungal growth. In comparison with the racks having perforated members, the present invention provides a rack which is resistant to fungal contamination in locations unavailable for cleaning during operational use.

The inside of the profiles cannot be cleaned therefore the absence of perforated hole is crucial for maintaining a "free" microbial surrounding.

Figure 9A:
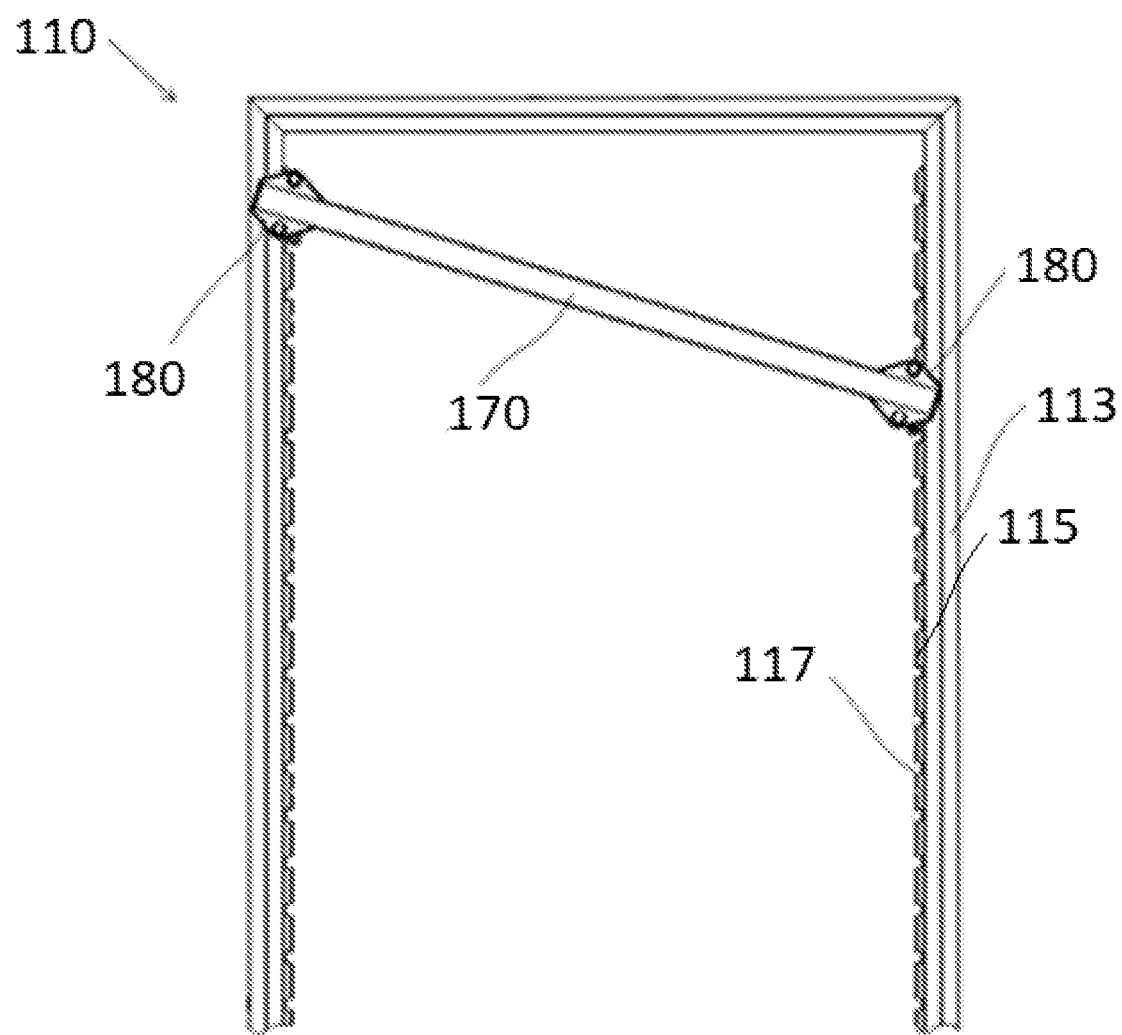
FIGS. 9a to 9c are front, back and back enlarged view of a diagonal crossbar with diagonal terminal adapters secured to a frame.
Figure 9B:
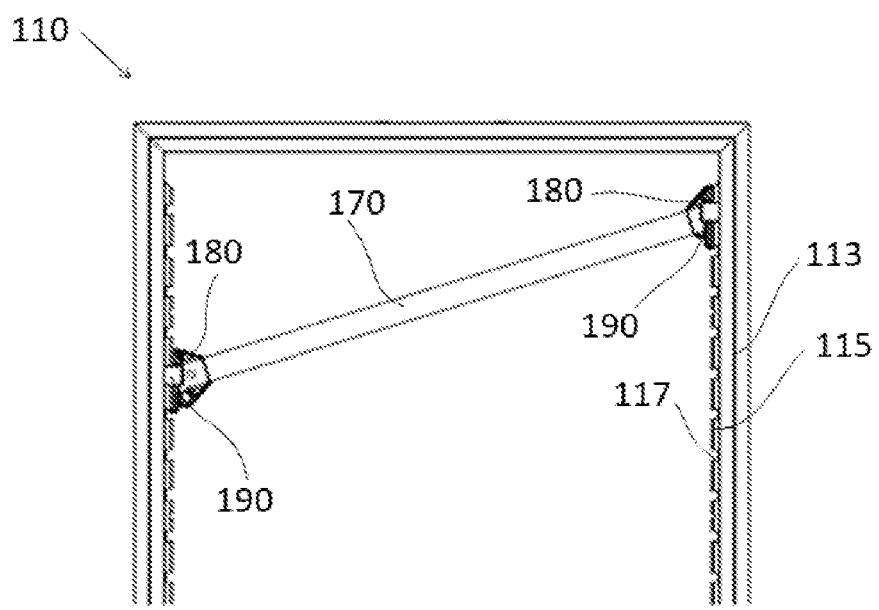
Figure 9C:
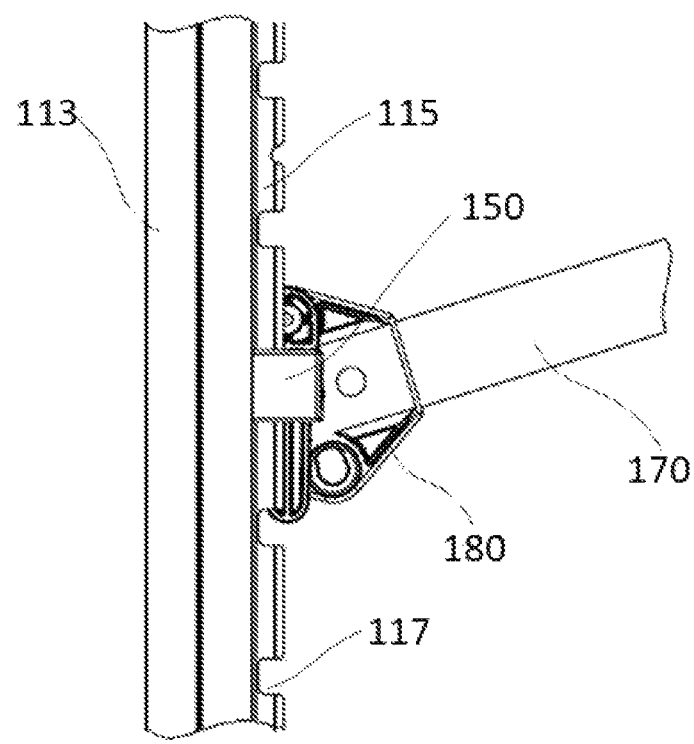
Figure 10:
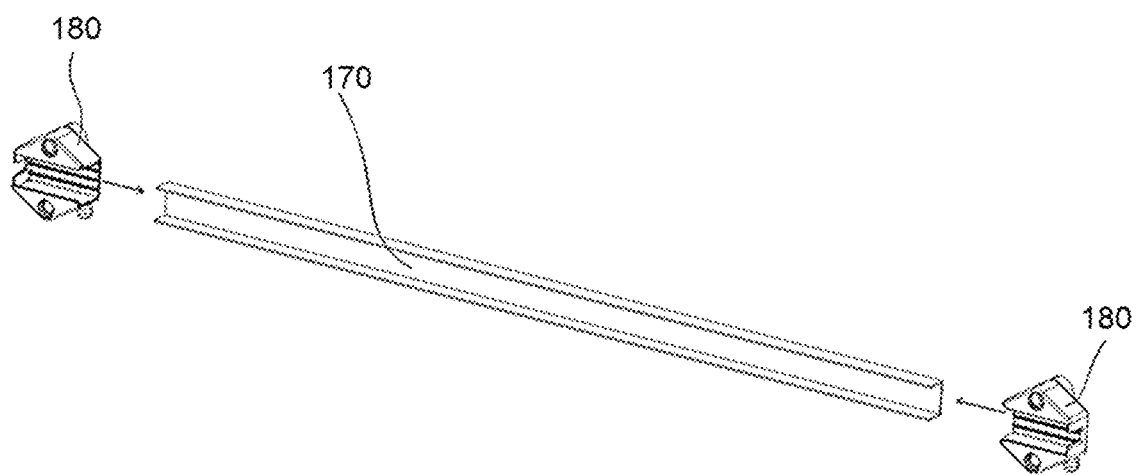
FIG. 10 is an exploded view of a diagonal crossbar and diagonal terminal adapters.

Reference is now made to FIGS. 9a to 9c presenting crossbar 170 mounted at an arbitrary angle to frame 110. FIG. 9a is a front view, FIG. 9b is a back view and FIG. 9c shows ab enlarged view of terminal adapter 180. Crossbar 170 is secured to frame 110 by terminal adapters 180. The aforesaid adapters are mechanically connected to anchoring plug members 190 which are inserted into notches 117 of projections 115 belonging to uprights 113. FIG. 10 illustrates securing terminal adapter 180 to crossbar 170.

Figure 11A:
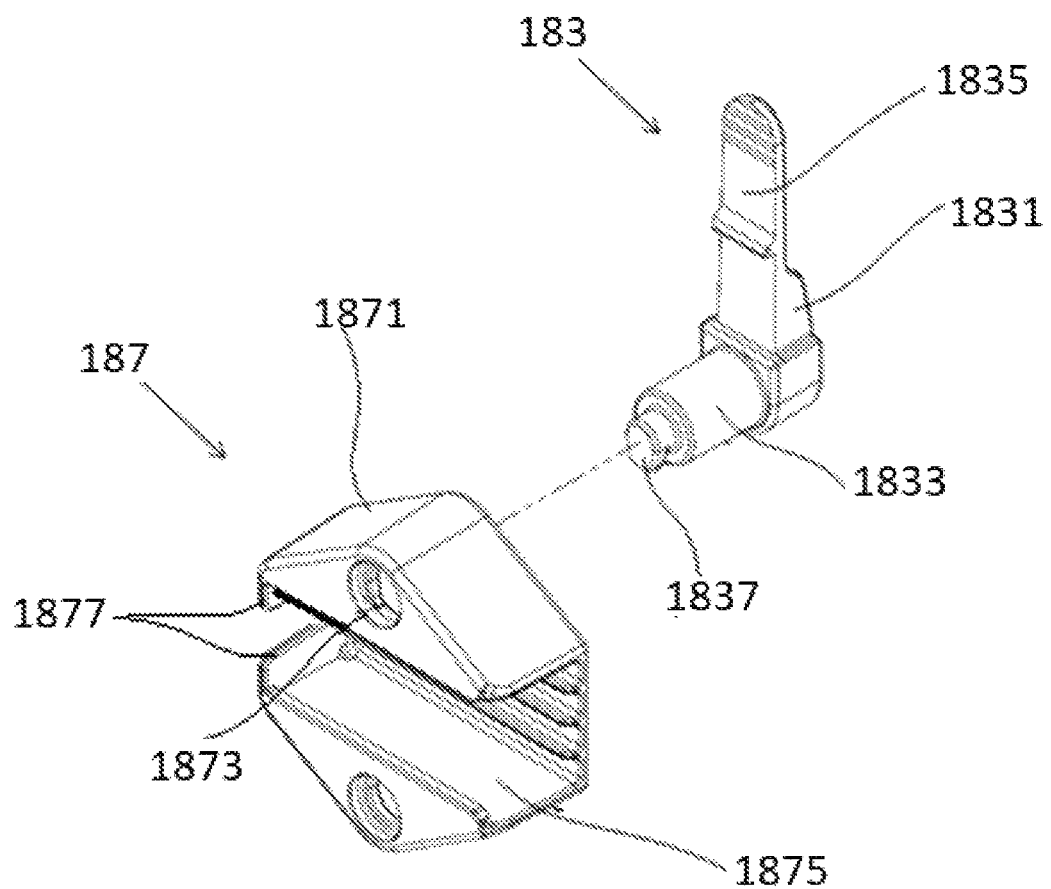
FIGS. 11a to 11c illustrate functioning of diagonal terminal adapters.
Figure 11B:
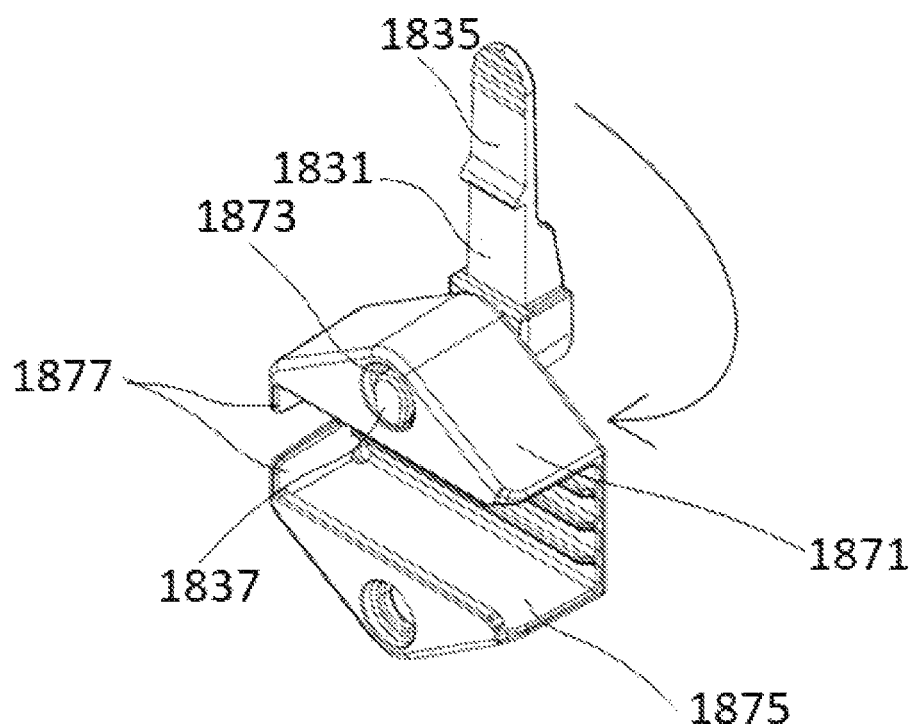
Figure 11C:
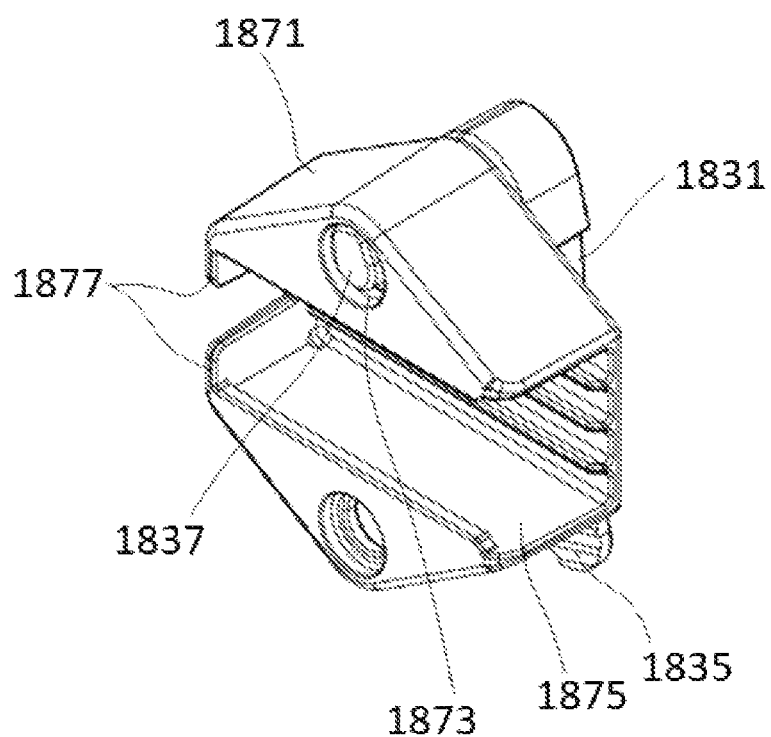

Reference is now made to FIGS. 11a to 11a presenting terminal adapter 180 in detail. Terminal adapter 180 comprises housing 187 and rotatable locking member 183. Housing 187 has outer surface 1871, an internal slot 1875 having arrester 1877 stopping crossbar 170 when inserted into slot 1875. Rotatable locking member 183 includes shaft portion 1833 provided with latching cam 1837 insertable into bore 1873 and configured for locking crossbar 170 within slot 1875 and handle portion orthogonal to shaft portion 1833 having has a claw insertable into bores of the anchoring plug members (not shown) being mounted in said notches. FIG. 11a shows an exploded view of terminal adapter 180. FIG. 11b shows an open position of terminal adapter 180 which is ready for receiving crossbar 170 while FIG. 11c shows a closed position of terminal adapter 180 which is ready for securing claw 1835 within a bore of the anchoring plug member.

Figure 12A:
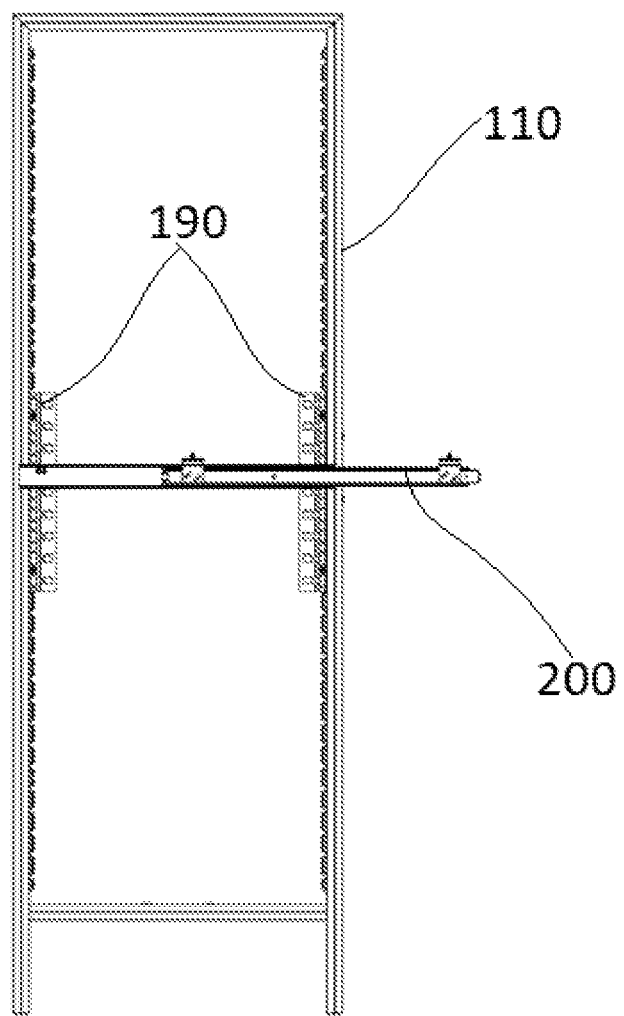
FIGS. 12a and 12b are front and back views of a perforated plate for mounting telescopic slides secured to a frame.
Figure 12B:
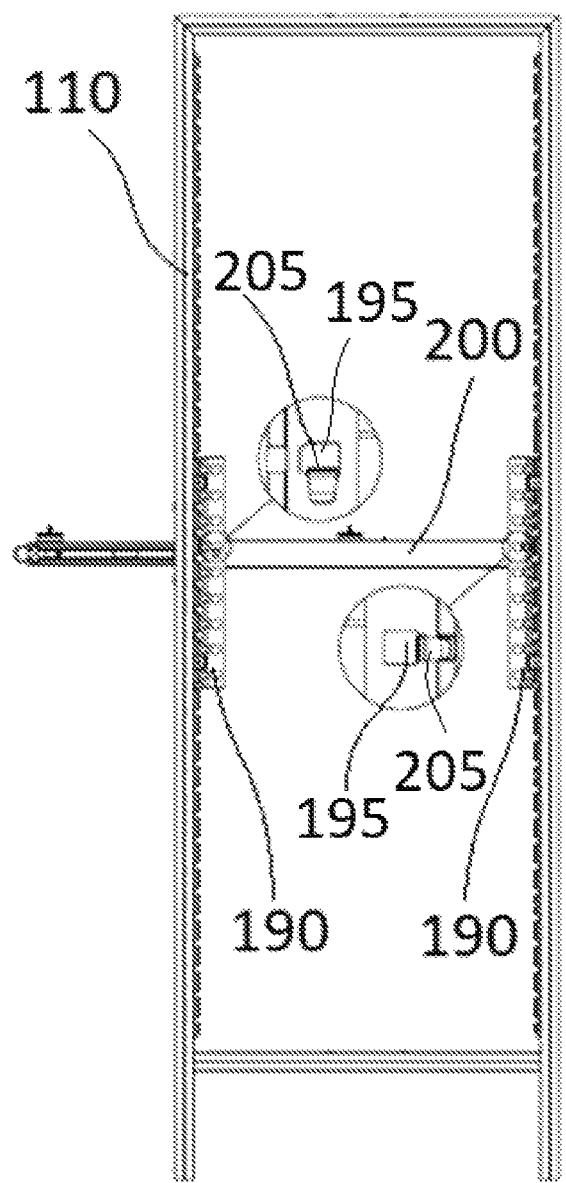

Reference is now made to FIGS. 12a and 12b showing telescopic slide 200 mounted on frame 110. FIG. 12a corresponds to a front view, while FIG. 12b to a back view. Telescopic slide 200 is provided with clamp member 205 securable within aperture 195 of plate 190.

Figure 13A:
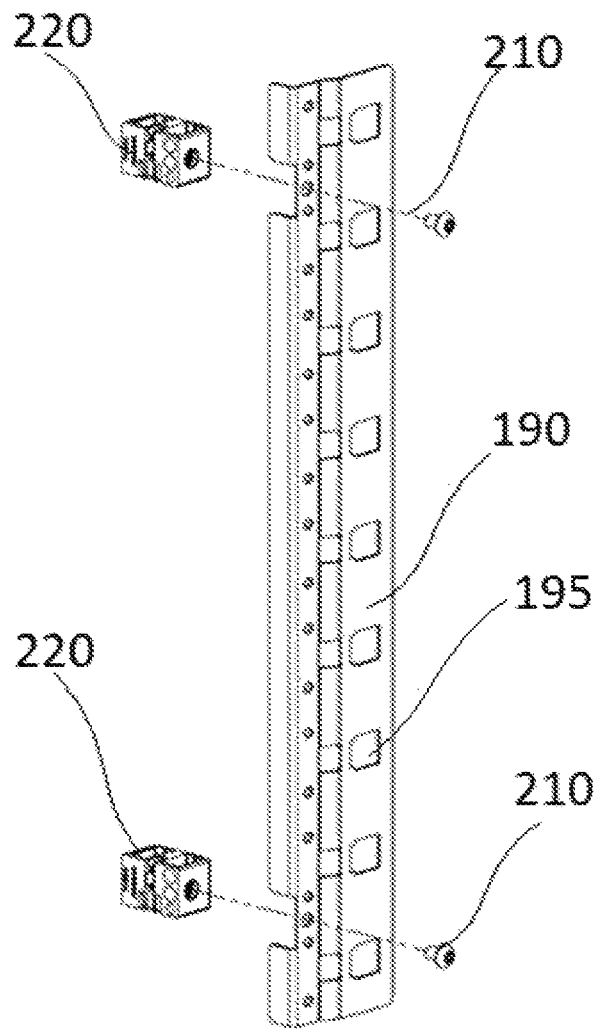
FIG. 13a is a view of an exploded view of a perforated plate with anchoring plug members.
Figure 13B:
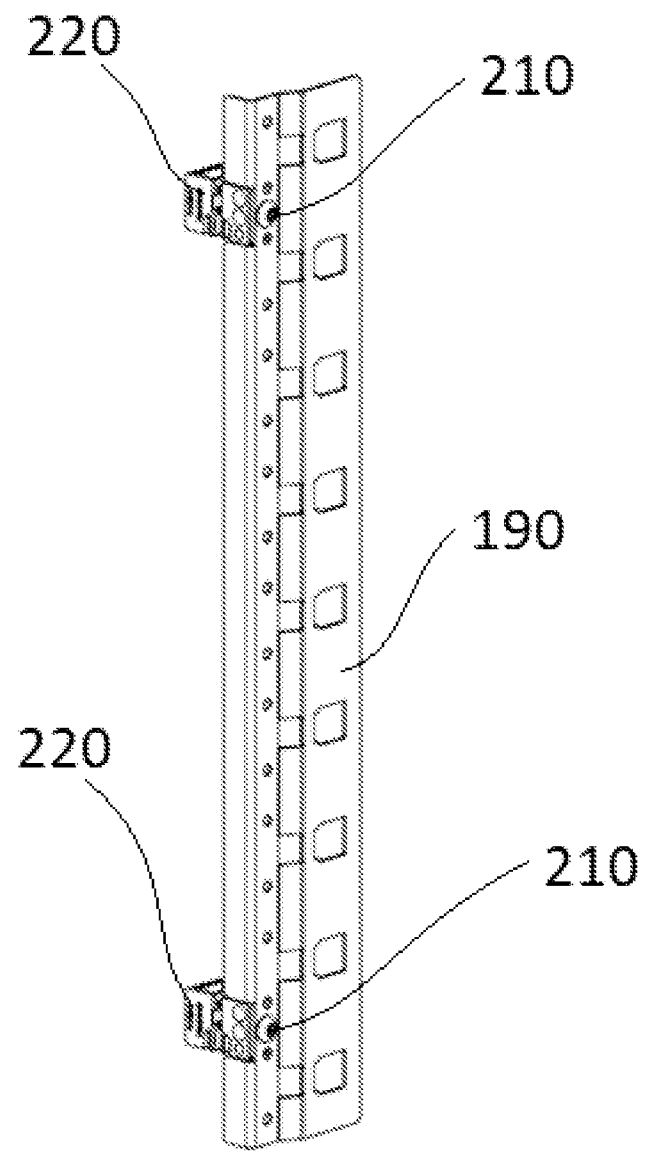
FIG. 13b is a view of an assembled view of a perforated plate with anchoring plug members FIG. 13c illustrate mounting a perforated plate on a frame.
Figure 13C:
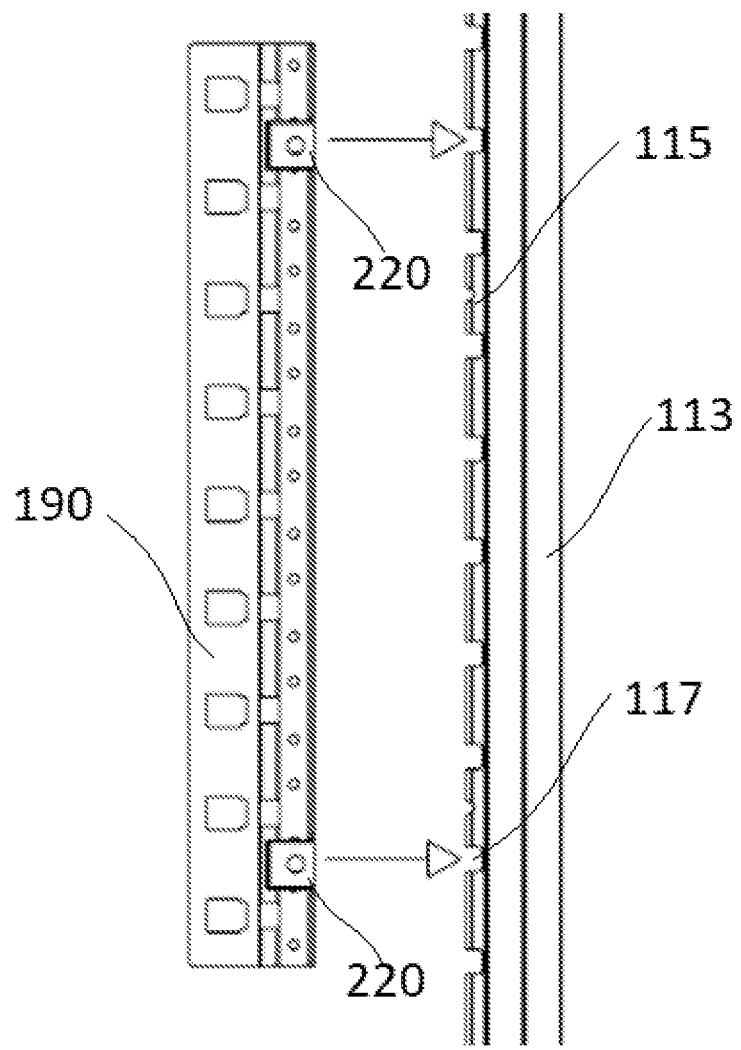
FIG. 13d is an enlarged isometric view of an anchoring plug member.
Figure 13D:
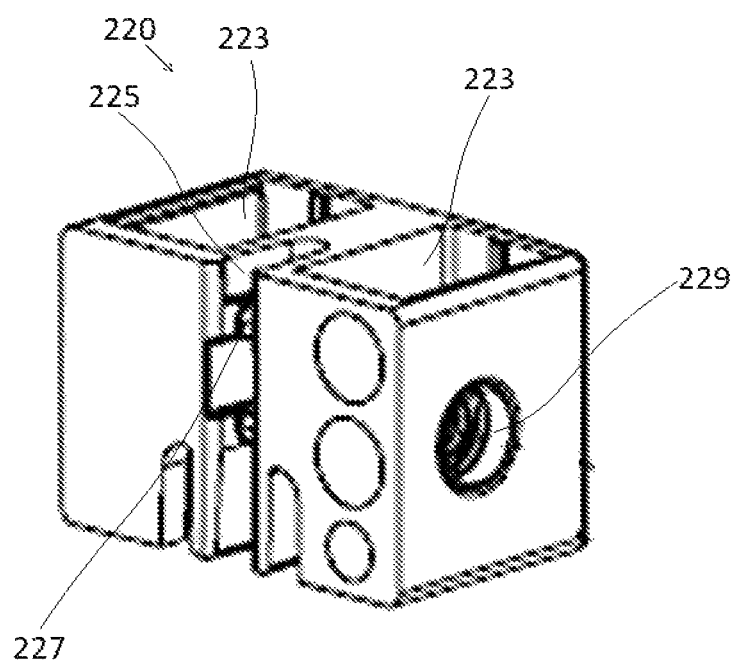

Reference is now made to FIGS. 13a to 13d illustrating steps of mounting plate 190 to frame 110. Anchoring plug members 190 are secured to plate 190 by means of screws or rivets 210 (FIG. 13a). FIG. 13b shows plate 190 and anchoring plug members 190 in an assembled position. FIG. 13c illustrates manual connection of plate 190 to upright 113 by inserting anchoring plug members 190 into notches 117. FIG. 13d shows anchoring plug member 220 is similar to member 150 and has slit 225 with cog 227. Slit 225 is configured for receiving side projection 115 therewithin while cog 227 secures anchoring plug member 220 on side projection 115 when inserted into notch 117. Numeral 229 refers to a bore configured for receiving and securing a connecting member (not shown) when anchoring plug member 220 is secured to plate 190 (not shown).

The invention claimed is:

1. A manually assemblable/disassemblable rack mount for a load comprising:
   a. a frame having first and second parallel spaced uprights arranged in a pair; each upright having a closed rectangular cross-section; said each upright comprising a side projection extending therefrom; said side projection having notches distributed along said side projection;
   b. at least one crossbar member having first and second terminals; said at least one crossbar member releasably securable between said first and second parallel spaced uprights;
   c. anchoring plug members sidewise insertable into corresponding notches of said notches on said projections of said first and second uprights;
   each crossbar member is provided with a pair of terminal adapters connectable to said first and second terminals, respectively; each terminal adapter has a claw insertable into a bore within each anchoring plug member, respectively;
   said at least one crossbar member with said terminal adapters connected to said first and second terminals of said at least one crossbar member is releasably mountable in a bridge position between said first and second parallel spaced uprights by inserting said claws of said first and second terminal adapters into said bores within said anchoring plug members being mounted in said notches.

2. The rack mount according to claim 1, said first and second parallel spaced uprights are made of a hollow beam of a close profile.

3. The rack mount according to claim 1, wherein any one of said first and second terminals of said at least one crossbar member and the corresponding terminal adapter have cooperatively configured male and female members releasably connectable to each other.

4. The rack mount according to claim 3, said male and female members are slidably connected to each other.

5. The rack mount according to claim 3, said male and female members are threadly connected to each other.

6. The rack mount according to claim 3, wherein at least one of said uprights, at least one crossbar member, terminal adapters, anchoring plug members and plates is made of a material selected from the group consisting of a metal alloy, a composite material, a plastic material, wood and any combination thereof.

7. The rack mount according to claim 3, wherein at least one pair of said terminal adapters is configured for securing said crossbar member to said uprights at an arbitrary angle thereto.

8. The rack mount according to claim 7, each of said at least one pair of said terminal adapters comprises a housing having internal surfaces forming a female slot for securing said terminals of said crossbar member therewithin and a rotatable locking member configured for locking said terminals within said female slot; said locking member comprises a shaft portion having a latching cam on a terminal thereof which is insertable into a bore within said housing and a handle portion orthogonal to said shaft portion; each said handle portion has a claw on a terminal thereof into said bores within said anchoring plug members being mounted in said notches.

9. The rack mount according to claim 1 comprising at least one pair of plates for mounting telescopic slides; each of said at least one pair of said plates is mechanically connectable to said anchoring plug members being mounted in said notches.

10. The rack mount according to claim 9, said telescopic slides are provided with clamping members thereon; each of said at least one pair of said plates has at least one aperture configured for receiving said clamping members thereinto and securing said clamping members therewithin.

11. A method of manually assembling a rack mount comprising steps of:
   a. providing a rack mount for a load comprising:
      i. a frame having first and second parallel spaced uprights arranged in a pair; each upright having a closed rectangular cross-section; said each upright comprising a side projection extending therefrom; said side projection having notches distributed along said side projection;
      ii. at least one crossbar member having first and second terminals; said at least one crossbar member releasably securable between said first and second parallel spaced uprights;

iii. anchoring plug members sidewise insertable into corresponding notches from said notches on said side projections of said first and second uprights;
   each crossbar member is provided with a pair of terminal adapters connectable to said first and second terminals, respectively;
   each terminal adapter has a claw insertable into a bore within each anchoring plug member, respectively; said at least one crossbar member with said terminal adapters connected to said first and second terminals of said at least one crossbar member is releasably mountable in a bridge position between said first and second parallel spaced uprights by inserting said claws of said first and second terminals into said bores within said anchoring plug members being in said notches;
b. positioning said uprights in a vertical position;
c. connecting said terminal adapters to said first and second terminals of said at least one crossbar member;
d. sidewise inserting said anchoring plug members into said corresponding notches from said notches on said side projections of said first and second uprights;
e. mounting said at least one crossbar member by inserting said claws of said first and second terminals into said bores within said anchoring plug members.

12. The method according to claim 11, wherein said step of connecting said terminal adapters to said first and second terminals of said at least one crossbar member comprises releasably connecting male and female members to each other.

13. The method according to claim 12, wherein said step of connecting said terminal adapters to said first and second terminals of said at least one crossbar member comprises inserting said terminals into a female slot formed by internal surfaces of said terminal adapters and locking said terminal by a rotatable locking member having a latching cam.

14. The method according to claim 11 comprising a step of mounting telescopic slides on plates further comprising mounting anchoring plug members on said plates, inserting said anchoring plug members into said notches and clamping said telescopic slides within apertures of said plates.

* * * * *